United States Patent
Torgersrud et al.

(10) Patent No.: US 10,554,717 B2
(45) Date of Patent: Feb. 4, 2020

(54) DYNAMIC VOIP ROUTING AND ADJUSTMENT

(71) Applicant: Intelmate LLC, San Francisco, CA (US)

(72) Inventors: Richard Torgersrud, San Francisco, CA (US); Peter K. Sheerin, Foster City, CA (US)

(73) Assignee: INTELMATE LLC, San Francisco, CA (US)

(*) Notice: Subject to any disclaimer, the term of this patent is extended or adjusted under 35 U.S.C. 154(b) by 0 days.

(21) Appl. No.: 15/413,076

(22) Filed: Jan. 23, 2017

(65) Prior Publication Data
US 2017/0134468 A1 May 11, 2017

Related U.S. Application Data

(62) Division of application No. 13/842,212, filed on Mar. 15, 2013, now Pat. No. 9,591,048.

(51) Int. Cl.
*H04L 29/06* (2006.01)
*H04M 3/58* (2006.01)
*H04M 7/00* (2006.01)

(52) U.S. Cl.
CPC ........ *H04L 65/605* (2013.01); *H04L 65/1016* (2013.01); *H04L 65/1043* (2013.01); *H04L 65/1053* (2013.01); *H04L 65/4038* (2013.01); *H04M 3/58* (2013.01); *H04M 7/006* (2013.01)

(58) Field of Classification Search
CPC ......... H04M 7/006; H04M 2203/2016; H04M 2203/652; H04M 2203/2011; H04M 3/436; H04M 3/4234; H04M 2203/1091; H04M 2207/20; H04M 7/1225; H04M 3/42314; H04W 4/16
See application file for complete search history.

(56) References Cited

U.S. PATENT DOCUMENTS

| | | | |
|---|---|---|---|
| 5,848,384 A | 12/1998 | Hollier et al. | |
| 5,883,665 A | 3/1999 | Galler et al. | |
| 7,573,848 B2 | 8/2009 | Choi | |
| 7,643,414 B1 | 1/2010 | Minhazuddin | |

(Continued)

FOREIGN PATENT DOCUMENTS

EP 2053783 A1 4/2009

OTHER PUBLICATIONS

VoiceAge White Papers, "Wideband Speech Coding Standards and Applications", VoiceAge Corporation, <http://www.voiceage.com> 2004-2006, pp. 1-17.

(Continued)

*Primary Examiner* — Un C Cho
*Assistant Examiner* — Peter K Mak
(74) *Attorney, Agent, or Firm* — Venable LLP; Jeffri A. Kaminski

(57) ABSTRACT

Systems and processes are provided for dynamically adjusting and routing signals and communications. According to one aspect, one or more codecs applied to the signals may be switched or changed to manage signal quality. According to another aspect, communications may be re-routed to an intended recipient entirely over the Internet. The systems and processes described herein are especially well suited for use in connection with detention environments.

6 Claims, 3 Drawing Sheets

(56) References Cited

U.S. PATENT DOCUMENTS

| | | | |
|---|---|---|---|
| 7,822,188 B1* | 10/2010 | Kirchhoff | H04M 3/436 379/211.02 |
| 8,340,260 B1 | 12/2012 | Rae et al. | |
| 8,737,571 B1 | 5/2014 | Seeley et al. | |
| 2002/0111156 A1* | 8/2002 | Roeder | H04M 3/58 455/417 |
| 2002/0141392 A1 | 10/2002 | Tezuka et al. | |
| 2002/0167937 A1 | 11/2002 | Goodman | |
| 2004/0017910 A1 | 1/2004 | Lim | |
| 2005/0043014 A1 | 2/2005 | Hodge | |
| 2005/0129003 A1 | 6/2005 | Baeder et al. | |
| 2006/0050682 A1 | 3/2006 | Vance | |
| 2006/0094472 A1 | 5/2006 | Othmer et al. | |
| 2007/0005351 A1 | 1/2007 | Sathyendra et al. | |
| 2007/0189275 A1 | 8/2007 | Neff | |
| 2007/0258573 A1* | 11/2007 | Lowmaster | H04M 3/4234 379/220.01 |
| 2007/0274236 A1 | 11/2007 | Araki | |
| 2008/0049738 A1 | 2/2008 | Joung et al. | |
| 2008/0139210 A1* | 6/2008 | Gisby | H04M 3/4234 455/445 |
| 2008/0267197 A1 | 10/2008 | Ahmadyar et al. | |
| 2009/0080411 A1* | 3/2009 | Lyman | H04M 7/0057 370/352 |
| 2011/0026701 A1* | 2/2011 | Kirchhoff | H04M 3/436 379/207.13 |
| 2011/0281580 A1* | 11/2011 | Tonogai | H04M 3/4231 455/426.1 |
| 2012/0020254 A1* | 1/2012 | Strope | H04L 12/66 370/259 |
| 2012/0177029 A1* | 7/2012 | Hillier | H04L 61/106 370/352 |
| 2013/0250035 A1 | 9/2013 | Murali et al. | |
| 2013/0329873 A1* | 12/2013 | Pearl | H04M 7/0024 379/93.01 |

OTHER PUBLICATIONS

VoiceAge, "Why reinvent the wheel . . . ", VoiceAge Corporation, <http://www.voiceage.com>, May 2007.

Cisco Systems, Inc., "Cisco IOS Voice Command Reference", http//www.cisco.com, 2010.

Shivani Sharma, S.K. Jain, R.M. Sharma, S.S. Agrawal, "Present Scenario of forensic Speaker Identification in India", O-COCOSDA 2010, Nov. 23-24, 2010.

Bernd Geiser, Hauke Krüger, Heinrich W. Löllmann, Peter Vary, Deming Zhang, Jualin Wan, Hai Ting Li, Li Gin Zhang, Candidate Proposal for ITU-T Super-Wideband Speech and Audio Coding, 978-1-4244-2354-5/09 2009 IEEE, ICASSP 2009, pp. 4121-4124.

Göran AP Eriksson, Stefan Håkansson, 'WebRTC: enhancing the web with real-time communication capabilities, Ericsson Review, Jan. 2012, pp. 1-7.

Communications and Information Network Association of Japan (CIAJ), Telephone Speech Quality Standards for Wideband IP Phone Terminals (handsets), CES-Q004-1, Mar. 30, 2009, pp. 1-12.

Global System for Mobile Communications, 3GPP Organizational Partners, "3rd Generation Partnership Project; Technical Specification Group Core Network and Terminals; Out of band transcoder control; Stage 2 (Release 7)", 3GPP TS 23.153 V7.2.0 (Mar. 2007), pp. 1-77.

Benjamin W. Wah Batu Sat, "The Design of VoIP Systems with High Perceptual Conversational Quality", Journal of Multimedia, vol. 4, No. 2, Apr. 2009, pp. 49-62.

V. Digalakis, L. Neumeyer, M. Perakakis, "Quantization of Cepstral Parameters for Speech Recognition over the World Wide Web", Selected Areas in Communications, IEEE Journal, vol. 17, No. 1; Jan. 1999, pp. 82-90.

\* cited by examiner

DYNAMIC VOIP ROUTING AND ADJUSTMENT

CROSS REFERENCE TO RELATED APPLICATIONS

This application is a divisional application of U.S. application Ser. No. 13/842,212, now issued as U.S. Pat. No. 9,591,048, filed Mar. 15, 2013.

Internet bandwidth constraints are a significant factor in the design and operation of VoIP-centric telephone and video-visitation systems and services for detention environments. Systems for environments other than detention environments may be designed and operated in favor of highly compressed transport of audio and video, with little regard to quality, to reduce costs. The goal of such larger systems may be to provide services that are "good enough" for the mass-market.

Because of the unique requirements of communications services for detention facilities, there is a need to provide balance between (1) a desire to provide key capabilities and a level of service that enhances utility for end-users (including, but not limited to, inmates and friends and family members), customers (e.g., detention environment operators and staff), and affiliated users (e.g., law-enforcement officials and investigators) and (2) a desire to provide a cost-effective communications infrastructure. Detention environments, which include, but are not limited to, jails, prisons, detention facilities, secured hospitals, and addiction treatment facilities, have a need for high-quality, cost-effective communications systems by which residents, including inmates, of the detention environments can communicate effectively with outside persons and devices.

Friends and family members of inmates and other residents of detention environments may have limited income, and the public switched telephone network (PSTN) and/or cell phone plans such individuals subscribe to may have a limited "free" minutes, or charge a per-minute rate that is substantially higher than other individuals pay. It would be useful to be able to transfer (switch over) calls made to friends and family members (and calls made by such friends and family members) from the PSTN to an entirely VoIP (Internet) connection, for which the friends and family members may have unlimited available bandwidth, or which they can access at a lower rate. Such PSTN-to-VoIP transfers may save the friends and family members money and thus allow them to communicate more often with the respective inmates.

Further, connecting all legs of conversations over the Internet may make it easier to set up and control multi-party communications, as well as offer additional services during the communications session. Such additional services may be impossible on a PSTN telephone call, and may be impossible on cellular telephone calls, where, for instance, the individual uses a cell network that does not offer simultaneous voice and data. The commonly used telephone voice codecs, namely ITU-T G.711 and G.729, are either bandwidth-intensive (G.711) or have less-than-ideal voice quality (G.729) or both, bandwidth-intensive (G.711) or incapable of transmitting data signals such as TTY or fax (G.729), or voice quality low enough to make speech and speaker recognition difficult (both G.711 and G.729).

G.711 and G.729 use the frequency bandwidth of ~7 KHz that has been typical of the telephone industry for more than one hundred years. Although this frequency range was chosen because it contains most of the audio energy in human speech, research has shown that higher frequencies contain more of the intelligible (discernible) aspects of human speech. Discarding frequencies between 7 KHz and 14 KHz reduces the intelligibility of voices, especially higher-pitched voices such as those of females, and also those of non-European languages which have music-like intonations that are core aspects of speech, and are typically called tonal languages. Reduced intelligibility impacts (1) human listeners (both inmates/visitors and detention facility staff/investigators) and (2) automated analysis tools such as speech recognition devices used in interactive voice response (IVR) systems and speaker recognition used in authentication and authorization systems and in investigative tools.

A more modern voice codec, ITU-T G.722, forms the core of the integrated digital systems network (ISDN), which was designed to replace the century-old PSTN telephone infrastructure with a system that can transport higher-quality voice and higher-bandwidth data than PSTN lines support.

Voice quality can be measured with "Mean Opinion Score" (MOS), which is a quantified but subjective metric of voice quality as determined by a wide range of listeners. Possible MOS scores range from 1 (bad) to 5 (excellent). The G.711 codec, widely used by telecommunications companies, uses 64 kbps to transport a 7 KHz (narrowband) voice signal and has an MOS score of 4.1. The G.729 codec has an MOS score of 3.70, which is noticeably lower in quality than G.711.

It is sometimes necessary to decode and re-encode an audio stream multiple times, such as when phone calls are forwarded across multiple VoIP systems. When this is done once with G.729 (two encodings), the MOS score drops to 3.27; when done twice (three encodings), the MOS score drops to 2.68—a much lower quality than G.711/standard analog telephone systems. These multiple conversions are referred to as "tandem encodings." Tandem encodings using different codecs often have even greater reductions in MOS scores or result in complete unintelligibility. Network analyzers may be used to automatically determine or estimate MOS scores.

Some of the codecs with lower bitrates and/or higher MOS scores require greater computational complexity, which requires a trade-off where costs are incurred, that is, in data centers and/or in network connections. The ideal voice codec has a high MOS score, low bandwidth requirements, and low computational complexity. Few if any such ideal codecs exist; hence a system for carefully and deliberately selecting and switching among various codecs, even in the middle of a communications session, is very desirable.

It should be noted that MOS is not the only system for scoring voice quality. Other methods include R-Factor, PSQM (Perceptual Speech Quality Measure), and PESQ (Perceptual Evaluation of Speech Quality), any of which may be used, instead of or as a supplement to MOS, in connection with the systems described in this disclosure.

Further, because many VoIP codecs cannot transport DTMF tones, they may complicate the normal operation of telephone calls which rely on using DTMF tones for the operation of IVR systems. It is desirable to be able to switch to a codec that does not interfere with automated voice recognition and automated speaker recognition systems, and which fully supports the high-quality audio needed for DTMF, voice recognition, and speech recognition. On the other hand, it may be desirable to make that switch only when required, as most of the high-quality audio codecs require higher bit-rates than do those typically used in VoIP systems that connect to the PSTN.

The problems and disadvantages of the prior art are overcome to a great extent by systems that are constructed in accordance with this disclosure. Among other things, this disclosure relates to, though is not limited to, a system and a process for selecting a better-matched voice codec, and switching to a different codec where available, and which is preferably matched to the needs of speech and/or speaker recognition software, so that optimum recognition accuracy is achieved when needed, and bandwidth is conserved during other times.

A system constructed in accordance with this disclosure may be configured to switch to a higher-quality voice codec while a call is in progress, in response to predetermined events. Such events may include, but are not limited to, the following: (1) upon the detection of a suspected multi-party call, the detection of certain foreign languages (mainly Asian) which require greater quality for intelligibility as compared with English and Spanish; (2) when an investigator has flagged a caller or callee as a subject of interest and desires greater fidelity for call monitoring and archiving; and (3) when one party in a communications session uses only one voice but communicates with others on a video conferencing system or a peer-to-peer audio system, such as Skype, which uses different and higher quality voice codecs than do telephone calls, where using the same or a similar voice codec will result in greater call fidelity for the participants and for investigators.

High video quality may be important to achieve satisfactory facial recognition. According to one aspect of this disclosure, however, video codec switching is not done during (in the middle of) a communications session. Instead, only simple bitrate/bandwidth adaptation is performed, typically to balance audio and video performance. Where it is more important to maintain high quality audio performance, preference may be given to providing real-time, non-distorted audio, and then the video stream may be adapted to fit within the remaining available bandwidth. According to this system, the quality of the video stream may improve as the bandwidth increases, and vice-versa.

This disclosure is not limited to systems for use in connection with detention environments. On the other hand, according to one aspect of this disclosure, a system may be specially configured for use in connection with a detention environment. In contrast to detention environments, general-purpose VoIP telephone services have a much larger base of subscribers, who have an even larger aggregate base of telephone numbers that the subscribers call. Consequently, it would be more difficult in such general-purpose services to detect and/or re-route calls over VoIP instead of the PSTN.

Systems constructed in accordance with this disclosure may be combined with an Inmate Telephone System (ITS) and, if desired, there may be a required registration process. Since ITS is a relatively closed system, use of ITS and/or a required registration process limits the number of potential customers and potential contacted parties and devices such that performing database searches and using the other techniques described in this disclosure become more feasible. Additionally, the system's social networking service, when installed on mobile devices used to contact inmates, combined with the registration database, allows a greater likelihood of finding or creating a direct VoIP connection when the inmate dials a PSTN number.

According to one aspect of this disclosure, a system is configured such that outputs from a voice/speaker recognition device are used to select and/or adjust the voice codec used at any particular instant. For example, voice/speaker recognition success scores may be used to determine which voice codec or bitrate to use (that is, to switch to), and this configuration may be especially applicable to a communications system for a detention environment.

A system constructed in accordance with this disclosure may be configured to automatically avoid the PSTN when connecting an outbound call dialed from a VoIP telephone system. The determination of whether an alternate VoIP connection exists should be made within a small time window (e.g., in less than twelve rings) in order to maintain short connection times, and the selection or configuration of a voice codec should likewise happen within a relatively short time (preferably in less than five seconds, and more preferably in less than one second) in order to catch changes of quality, speaker, and to adapt to varying audio and network conditions.

According to a preferred embodiment, all calls that are made by inmates who are within a detention environment may be sent or re-routed to service-provided applications on smartphones. Redirecting calls in this manner may avoid communications charges, improve audio quality, and enable features that are not possible when transporting voice communications over the PSTN.

According to another aspect of this disclosure, the voice and video codecs that are used for communications sessions may be selected and adjusted based on automated quality measurements and/or the reports of one or more voice/speaker/facial recognition devices, so as to ensure optimum extraction of intelligence from the communications sessions.

If desired, a system constructed in accordance with this disclosure may attempt to avoid the PSTN in favor of pure VoIP connections, to maintain higher voice quality, and then the system may use the preferred connection to aid in voice and speaker recognition on all segments of the conversation. Avoiding the PSTN in this manner may also have the benefit of reducing costs.

A system constructed in accordance with this disclosure may employ a user database and search schemes to determine and use VoIP addresses associated with a particular telephone number. The system may use such determined data to bypass the PSTN anytime a call is made to a PSTN number for which such an address can be found. Once the PSTN is bypassed, the system may then adjust the VoIP voice encoding throughout the communications session to ensure optimum quality for conversations and voice/speaker recognition accuracy.

DETAILED DESCRIPTION

Figure 1:
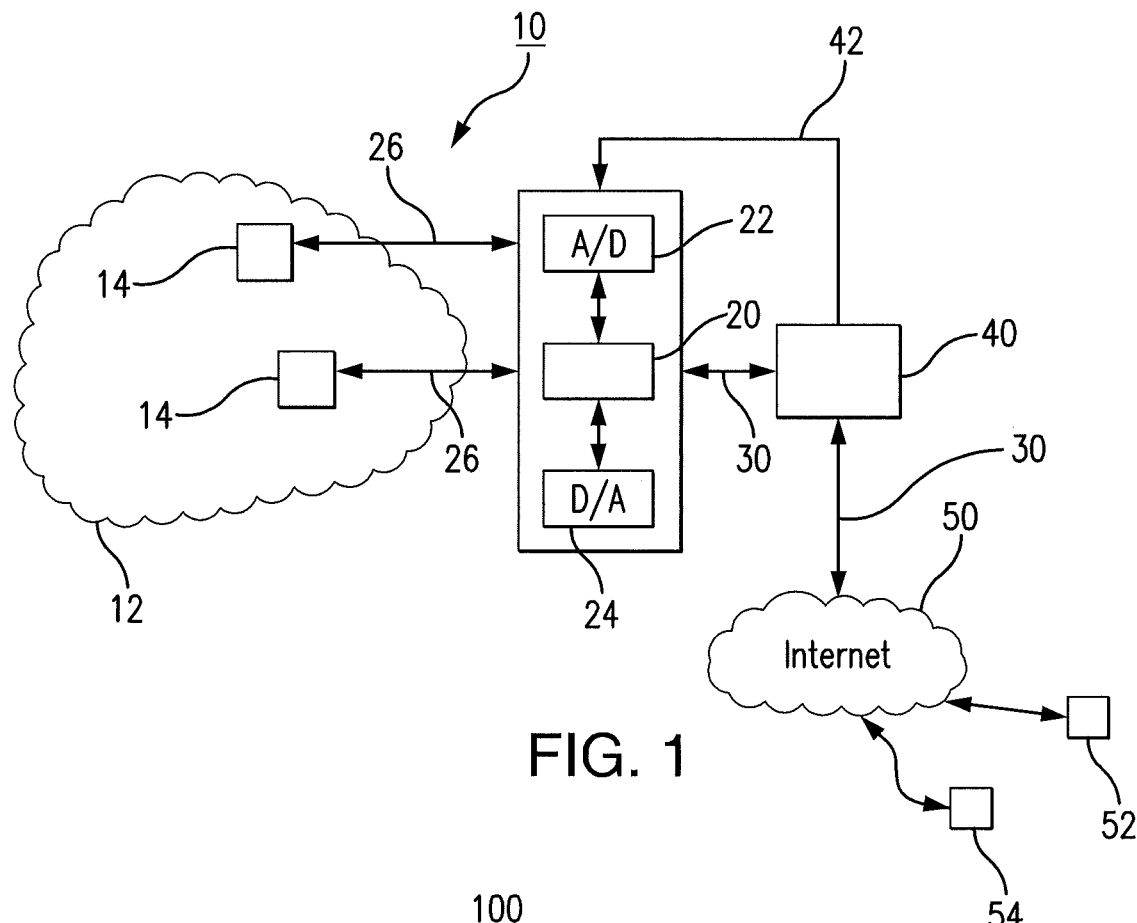
FIG. 1 is a schematic diagram of a communications system constructed in accordance with a first embodiment of this disclosure.

Voice Codecs.

Voice codecs that may be used in telecommunications systems include the following: G.711 is a narrowband uncompressed codec which, among narrow-band codecs, provides the best audio quality, but uses the greatest network bandwidth, at 64 kbps, and is the standard by which other narrowband codecs are measured. It supports voice (reliably), data and fax (fairly reliably), and it passes DTMF tones.

G.729 is a narrowband, low network bandwidth, at 8 kbps, compressed codec designed to increase efficiency of VoIP networks. Its audio quality is inferior to G.711, it does not pass DTMF tones, data, or fax signals reliably and/or efficiently.

G.722 is the most commonly supported wideband voice codec. It is used in professional grade speakerphones, such as those available from Polycom. Originally designed for ISDN voice telephone lines, it is often used as a reference for wideband voice quality. However, G.722 uses the same bandwidth as G.711, namely 64 kbps, making it unsuitable for many uses, especially when network congestion exists.

G.722.1 is a wideband and superwideband codec, and is widely supported in the telephone industry. However, this codec may be mainly suitable for use on speakerphones where there is a high-bandwidth low-latency network connection. It is not suitable for other uses, such as on mobile phones and in locations with a large amount of background noise. Additionally, G.722.1 lacks some voice codec features that aid voice/speaker recognition, such as voice activity detection (VAD), and others that provide a more pleasing communication experience, such as comfort noise generation (CNG).

G.729.1 is a wideband enhancement to the narrowband G.729 narrowband codec, which remains backward compatible by layering on additional voice and data bandwidth. Terminal equipment that only supports G.729 can be given only the original bytestream and participate in the communication session.

G.722.2 is a wideband codec also referred to as AMR-WB (Adaptive Multi-Rate Wide-Band), and is intended for use in both wireless and wired communications networks, specifically for wideband audio interoperability. G.722.2 supports eight different bitrates, with defined mechanisms to select among them when bandwidth conditions change (the adaptive multi-rate portion of the standard). At bitrates of 12.65 to 23.85 kbps, G.722.2 is considered high-quality wideband. Lower bitrates are intended for temporary use only during times of peak network congestion. G.722.2 is being deployed in nationwide cellular telephone networks and cell phones, such as Apple's iPhone 5. It is also available in certain VoIP softphones, running on desktop computers and smartphones, and is used in IP multimedia subsystem (IMS), multimedia messaging service (MMS), and transparent end-to-end packet-switched streaming service (PSS).

G.722.2 is the preferred voice codec for use in the preferred embodiments that are described herein, for at least one or more of the following reasons: (1) it provides the best audio experience for communications session participants; (2) it can be adjusted to use less bandwidth during network congestion; (3) the use of a common codec type minimizes tandem encoding quality loss; and (4) it can be supported on many modern communications terminal equipment, with the notable exception of PSTN telephones and older VoIP hardphones.

SILK is a wideband and superwideband voice codec developed by Skype, Limited (now owned by Microsoft). It is the primary voice codec for Skype communications.

Opus was developed by Skype, Limited and published as an IETF recommendation, RFC 6716, and it may be the future primary voice codec for Skype communications. Like G.722.2, it supports multiple data rates so that its bandwidth requirements can be adapted to meet system needs and network conditions. It is also one of the mandatory audio codecs in the WebRTC (Web Real-Time Communications) standard that is evolving as part of HTML5. Therefore, it has high interest for communications systems interoperability. Notably, both G.722.2 and Opus support multi-channel (two or more separate audio channels) streams, which allows for multi-channel streaming and archiving of communications sessions, such as three-way and conference calls.

Although all of the codecs and related systems described herein, and other voice codecs, generally offer superior audio quality and voice/speaker recognition as compared with G.711 and/or G.729, not all are as suitable for the systems described herein, especially not in all cases. First, because the systems described herein may interoperate with a wide variety of telephone terminal equipment and VoIP services in use by friends and family members of inmates, it is desirable to have flexibility as to which codec is used for each call. Second, because of tandem encoding problems, it is desirable to use the same codec on both or all endpoints of each conversation, so as to achieve maximum possible voice quality given the communication channel nature during the period of the communication session. Third, because not all terminal equipment and/or VoIP services and equipment support codec negotiation, it is desirable to support as many wideband codecs as possible, so as to maximize the likelihood of being able to use the same codec on all segments of the conversation.

Those skilled in the art will recognize that many other existing and yet-to-be-developed voice codecs and other devices of comparable functionality may be used in accordance with this disclosure. The preferred codecs may change over time, as other technologies and network conditions develop and change.

First Embodiment

Turning now to the drawings, where like reference numerals designate like elements, there is shown in FIG. 1 a communications system 10 that is constructed in accordance with this disclosure. The system 10 is associated with a detention facility 12 and has one or more traditional PSTN analog telephone terminals 14 connected to a VoIP gateway device 16. The telephone terminals 14 may be located within the detention facility 12, and are used by inmates or other residents of the detention facility 12. The gateway device 16 may include an analog telephone adapter (ATA). The VoIP gateway device 16 contains an embedded computer system 20 and analog-to-digital (A/D) and digital-to-analog (D/A) converters 22, 24 that convert the narrowband analog voice signal 26 from the PSTN terminals 14 to digital voice signals 30, and convert digital voice signals 30 to narrowband analog voice signals 26 for transmission of the other end of the conversation back to the respective phone 14. The gateway device 16 may be, or may be similar to, an ADTRAN Total Access 924. Since the gateway device 16 may be designed for use with only narrowband telephone terminals, the VoIP codecs that the device 16 supports may be limited to narrowband codecs, most typically ITU-T G.711 or ITU-T G.729, G.729a, or G.729b.

Whereas G.711 uses a full 64 kbps data channel, and the several variants of G.729 consume between 8 and about 32 kbps (depending on the overhead of the network transport), VoIP systems operating with limited network bandwidth typically favor G.729. However, as described above, this codec does not transport DTMF and is typically of poor quality in terms of supporting accurate speaker recognition.

Therefore, a call processing system 40 can be employed to determine when speech or speaker recognition is needed or desired, based, for example, on one or more of the factors described herein. When speech or speaker recognition is needed or desired, the call processing system 40 outputs a corresponding signal (42) to the processor 20 of the gateway device 16 to switch from G.729 to G.711 for as long as voice/speaker recognition is required or desired. When speech or speaker recognition is no longer needed or desired, the call processing system 40 outputs a corresponding signal (42) to the processor 20 to switch from G.711 to G.729, thus again conserving network bandwidth, at the expense of lower-fidelity audio for the parties speaking. A centralized call platform that may be adapted for use in the system 10 illustrated herein is described in U.S. patent application Ser. No. 12/826,153, filed Jun. 29, 2010. The entire disclosure of U.S. patent application Ser. No. 12/826,153 is incorporated herein by reference.

Second Embodiment

Figure 2:
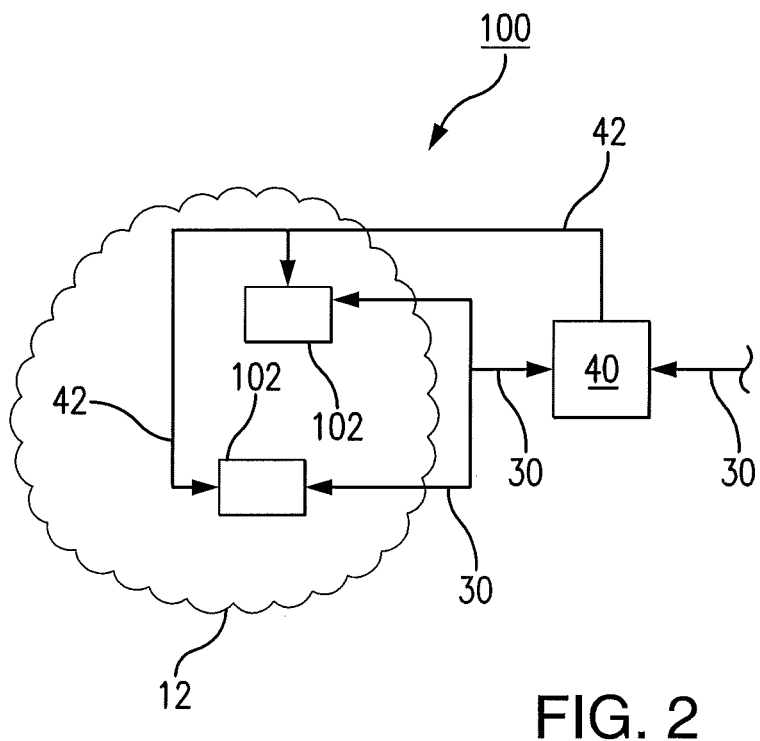
FIG. 2 is a schematic diagram of a system constructed in accordance with a second embodiment of this disclosure.

A second embodiment of this disclosure is illustrated in FIG. 2. The second embodiment is less constrained than the first embodiment. In the system 100 that is illustrated in FIG. 2, terminal equipment 102 supports VoIP directly, converting analog audio inside the device 102 directly to VoIP codecs. In this case, the microphone and speakers of the equipment 102 are designed to support at least wideband audio. With this high-fidelity audio path enablement, VoIP D/A and A/D converters within the equipment 102 are able to support encoding and decoding wideband VoIP codecs, such as G.722, G.721, G.729.1, G.722.2, SILK, and Opus.

All of the codecs mentioned above, plus other suitable codecs, may be installed and/or configured in each of the voice-capable terminals 102, and the other equipment 40 is correspondingly configured. This gives the system 100 the ability to match codecs with nearly any particular communications end point used by those communicating with the system 100.

The second embodiment may be particularly useful where the detention environment has only telephone-grade wiring, which cannot support the needed network bandwidth to support modern network speeds, yet where wideband audio is desired. According to the second embodiment, existing analog phones 14 (FIG. 1) connected to VoIP ATAs (analog telephone adapters) 16 may be replaced by telecommunications terminals 102 (FIG. 2) that have the outward appearance of standard telephones, but internally use wideband audio (50 Hz to 7,000 Hz) components, including the handset speaker and microphone, internal analog-to-digital and digital-to analog converters, and conventional computer modems, operating at a bandwidth of at least 28.8 kbps, which digitize wideband audio, transmit and receive the digitized audio over conventional computer modems to similar modems elsewhere in the facility 12, which then transmit and receive the digitized audio to servers with full Internet connections, whereupon the signals are processed in a like manner as wideband audio communications being conducted by the same system using computer-based telecommunications terminals that connect directly to Ethernet, and thus avoid the need for analog telephone modems.

Codec Switching and Call Processing.

In the case where one or more individuals located outside the detention environment 12 use software, devices, or service providers that do not support a particular codec, the processor 20 (in the case of the first system 10) or the terminals 102 (in the case of the second system 100) may refer to a lookup table to determine which of the remaining codecs available in the system are likely to provide the desired results, and establish communication with the most suitable codec.

Although tandem encoding or transcoding is less desirable in many cases, if the only codecs available on the external segments of a communication session are less suited to voice and/or speaker recognition, the system may determine that the inmate side of the communication is more important, and set that segment to the preferred voice codec for the purposes of voice and speaker recognition, and then transcode communications between the inmate and outside parties. This may necessitate archiving the recording of the communications session in a hybrid format, for example, as a separate audio file for each segment of the conversation, linked by metadata contained in a separate file or database.

According to a preferred embodiment, a communications session is started with a codec and bitrate suitable for high-quality voice and speaker recognition, to support accurate identity verification using voice biometrics, even if network conditions are congested at the time. After initial authentication, the system may then adapt the bitrate or negotiate and select other codecs to adjust overall network usage on the system.

There are a number of activities or conditions which may trigger the need to temporarily switch to a higher-quality codec, and they may be detected in a number of different ways, as follows:

In the simplest test, the system detects the use of DTMF tones by the inmate's terminal 12 (FIG. 1). If a codec that is incapable of transmitting DTMF tones is being used, this is typically done with out-of-band methods as described in various VoIP standards known to those skilled in the art, such as RFC 2833, RFC 4733, RFC 4734, SIP INFO, and so on. Upon first detection of DTMF tones, the system switches to a DTMF-capable codec and stays there until the IVR process is completed.

Upon system-initiated need for IVR, authentication, or speaker recognition, the illustrated system may switch to a higher-quality codec until the need for it ends, and then the system may revert to the lower-bandwidth codec.

Upon detection of a three-way or multiparty call or the initiation of a permitted multi-party call, the system may force or attempt to negotiate all parties in the communication session to high-quality voice codecs for the entire duration of the multi-party call.

Upon initiation of a call by an individual whose activity has been flagged by detention environment staff and/or investigators for closer scrutiny, the system may force or attempt to negotiate all parties in the communications session to high-quality voice codecs for the entire duration of the multi-party call.

Upon detection of an individual via speaker recognition on any segment of a communication session whose activity has been flagged by detention environment staff or investigators for closer scrutiny, the system may force or attempt to negotiate all parties in the communication session to high-quality voice codecs for the entire duration of the multi-party call.

According to one aspect of this disclosure, the system 10, 100 monitors the communications channels, or the inmate's communication segment, continually with equipment or software that monitors the MOS (or other voice quality metric) score, and adjusts the present codec bitrate or negotiate a different codec so as to ensure a quality metric within the optimum range for the speaker recognition system.

In the case where continuous or near-continuous voice biometrics are used to ensure continual verification that only authorized and authenticated users are communicating, in addition to monitoring the MOS score, the system continually monitors the value of the speaker recognition match, and should the value drop below a specified threshold, force the negotiation and/or use of higher quality codecs. The reasons why higher quality voice transmission and recording are desired in such circumstances include, but are not limited to the following: such drops in recognition score may indicate a different speaker, a different tone of voice, another source of audio (such as a recording or another telephone call) being introduced on the call, or a bridged or forwarded or multi-party call. The automatic switching to a higher-fidelity audio codec benefits not only the speaker recognition system, but also human investigators who monitor the conversation in real-time or listen to an archive of it later.

To support the MOS-based codec selection, a VoIP analysis device or software component 40 (FIG. 1) is inserted into the system in-between each inmate telephony terminal and the IP-PBX. The VoIP analysis device or software component may transmit (42) its results to the processor 20 (or to an application server, not illustrated).

According to a preferred embodiment, the same application server that receives the results of the VoIP analysis device may adjust the QoS settings for devices connected to the same network as the VoIP channel for which increased voice/speaker recognition is desired, increasing that channel's priority and reducing packet loss and jitter, which interfere with voice/speaker recognition. The system may also purposefully degrade the performance or quality aspects of other voice or data connections on the same network segment, specifically for the purpose of increasing the quality of the VoIP communication of interest so as to increase the voice/speaker recognition performance and/or accuracy.

As with the audio stream, the system may, if desired, perform frequent or continuous facial recognition on the video stream. In this case, the application server also monitors the output of the facial recognition success, and as with the audio codec, adjusts the video codec settings to higher-quality values whenever the facial recognition confidence score drops below a specified threshold.

According to yet another embodiment of this disclosure, the system may connect to VoIP software or devices that do not use standard telephony codecs, for example, services such as Skype, Google Talk, and others, and when connected to those services, may use the same codecs used by those services throughout the VoIP communications link to the inmate, including IP-PBX switches and the communications terminal 14 inside the detention environment 12.

In another embodiment, the system uses a database of codec distortions particular to tandem encodings to make a best-effort guess as to which codec any endpoint of the unknown system is using, and adjusts the codecs used by the system for the rest of the communications channel to be one known to minimize tandem encoding artifacts with the suspected codec on the other end.

In another embodiment, the system cycles through all available codecs, on at least the audio path to the communications channel with the unknown codec, starting with a baseline reference (for instance, G.711 or G.722), for which a voiceprint score is captured, and then compared in a pairwise manner with voiceprint scores for all the other codecs, or all possible pairings of available and a best-effort guess is made that the pairing with the highest score is likely to be the codec used on the unknown end of the communications session. The latter codec is then used for the remainder of the communications session, until such time as the voiceprint score changes, indicating that either the individual speaker voice changed or that a different codec was selected on the other end of the conversation, as may happen in a wireless network when conditions change.

Bypassing PSTN Network where VoIP-to-VoIP is Possible.

In order to achieve the optimum speaker recognition and perform other analysis on telephone calls, and to reduce costs on both the service provider and the customer, it is desirable to route as many calls as possible as VoIP content entirely over the Internet 50 and not via the PSTN.

In the case of video visitations in a detention environment, the system may be configured such that no portion of these communications traverses any part of the PSTN.

Also, for such video visitations, the system already typically has verified identity information for all parties on the communication.

Inmate telephone calls typically originate from the inmate and the telephone terminals 14 inside the detention environment 12. The inmate may be allowed to call anyone not already on his or her prohibited contact list, and the called party, who uses a cellphone 52, is then presented with an automated request which states that the call is from the detention environment 12, identifies the inmate who is calling, and then asks, by way of an IVR system, whether the called party would like to accept or decline the call, or block all future calls from either that inmate or the entire facility.

Because the inmate telephone terminal 12 is an analog hardphone with only a traditional DTMF keypad available for dialing the contact, no standard or readily available method of calling a VoIP number without using the PSTN is typically available. Nor is there any capability within the PSTN for determining whether the called number (52) is actually a VoIP terminal and thus reachable without traversing the PSTN. Therefore, the system may be configured to determine whether the called party can be reached directly via VoIP, or could be provided with or has another device 54 for communicating via VoIP for each particular call attempt.

There are several ways to establish a VoIP-to-VoIP call according to this disclosure, including, but not limited to, the following: (1) already having the called party's (54) VoIP address (e.g. SIP URL, Skype ID, etc.), entered by them manually into their account profile; (2) having an inmate communications application associated with the system installed on the called party's computer or smartphone 54, with its electronic address known by the system; (3) where possible, performing an ENUM lookup on the telephone number (52) on publicly and privately available ENUM registries; (4) performing a lookup of the dialed number (52) in telephone system-related databases that provide ownership or hosting of the telephone number with a particular telephone company or service provider, which can then be used to attempt to establish a VoIP connection using the dialed number and a published or well-known VoIP address format (e.g. SIP URL) for the company. For example, the SIP URL format for Vonage telephone numbers is commonly known to be: sip: {10-digit Vonage_Phone Number}@sip.votage.net; (5) brute-force VoIP dialing attempts, using all published or well-known SIP URL formats, along the lines of the Vonage SIP URL address. Even if several dozen VoIP connections are attempted simultaneously, as for example, with a SIP INVITE request, there is little harm done, as the number of characters transported is miniscule, at most one of the requests would be successful (as only one service provider may have the assignment for any one PSTN telephone number), and the rest of the other requests would simply be declined.

Another way to establish a VoIP-to-VoIP call is to provide an SMS invitation to the callee with a URL that launches a system smartphone application, or alternately, a URL that launches a web site containing an HTML5 communications application, using WebRTC, thus providing immediate VoIP connectivity without installing any software on the smartphone 54.

According to another aspect of this disclosure, the system may be configured to detect when a friend or family member currently on a PSTN call on a smartphone with a system VoIP or video visitation app installed ventures into an area with a Wi-Fi signal, and, in response to such detection, automatically switch the call from the PSTN network to the VoIP network.

Figure 3:
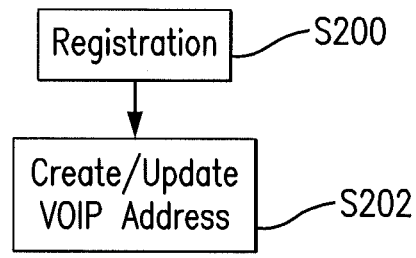
FIG. 3 is a flow chart for a process for enabling an outside person to be connected to a detention environment system for VoIP communications.

FIG. 3 illustrates a first process by which a device of a friend or family member of an inmate may be connected to a detention environment system for VoIP communications. In Step S200, the friend or family member registers an account, or installs a system-provided video visitation and/or VoIP smartphone client. In Step S202, the system creates a VoIP (e.g., SIP) address for the device, and updates the friend or family member's profile. In Step S202, the VoIP address is associated with the friend or family member's telephone number on file.

Figure 4:
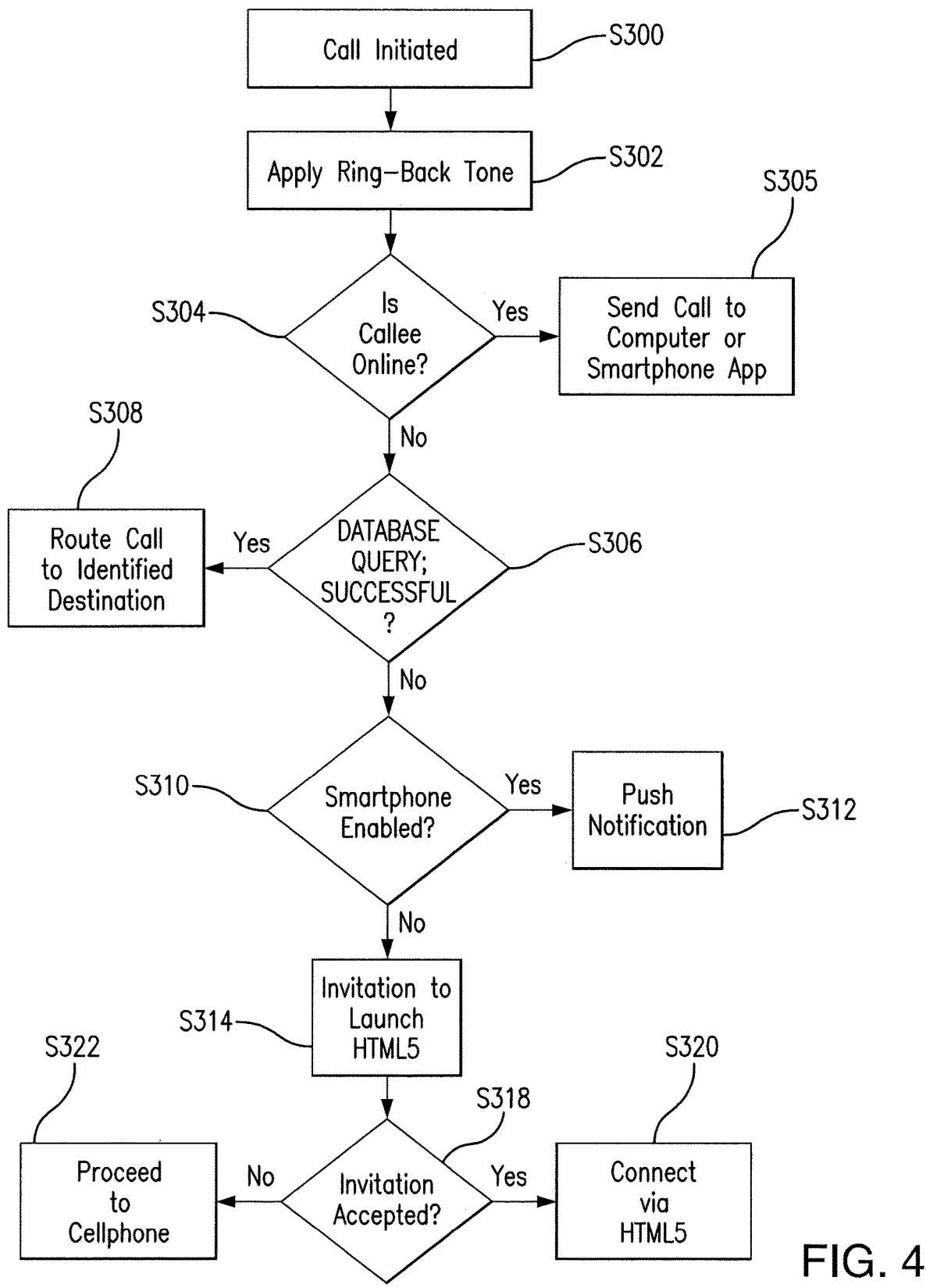
FIG. 4 is a flow chart for a process by which a call to a telephone number is routed to a VoIP destination.

FIG. 4 illustrates a rerouting process. At Step 300, the system receives a call placed by an inmate to the telephone number of a friend or family member (the callee). At Step S302, a ring back tone is sent to the inmate's phone, to indicate that the system is trying to reach the callee. While the ring back tone is being sent, the system immediately looks up the callee in the system to determine whether the person is online with a computer or a smartphone GettingOut app (S304). If the person is online with a computer or a smartphone GettingOut app (YES from S304), then the call is routed to that computer or smartphone app (S305).

If the callee is not online with a computer or a smartphone GettingOut app (NO from S304), then the system queries ENUM databases (public and other databases that link telephone numbers to Internet names and other Internet-related destinations and identities) to determine whether there is a corresponding Internet name and other Internet related destination or identity (S306). At the same time, the system may check its own database to determine if the callee has an account with the system and an account profile that may include a social network address known to support a VoIP communications system, such as Facebook, for example. If the result of these queries is positive (YES from S306), then the call is routed to the newly-identified destination (S308).

If the result of the ENUM query is negative (NO from S306), then the system determines whether the callee has a GettingOut app installed on a smartphone with push notification enabled, or if they are logged into a web interface maintained by the system (S310). If the result of that determination is positive (YES from S310), the system sends a push notification and asks the callee if he or she wants to connect via VoIP in exchange for a longer/cheaper call. The push notification may state the system will ring the callee's phone in, for example, fifteen seconds if the invitation to connect via VoIP is declined (S312).

If the result of the latter determination is negative (NO from S310), then the system may send an SMS message to the callee with instructions along the lines of the following: "Click here to launch HTML5 VoIP, reply CALL to have us ring your cell phone now, reply LATER to decline call" (S314). If the callee clicks on the HTML5 (YES from S318), then the system attempts to connect to the callee via the HTML5 app (S320). If the callee does not click on the HTML5 within, e.g., fifteen seconds (NO from S316), then the system will time out and place the inmate's call to the callee's cellphone (S322).

Cache Embodiment.

Figure 5:
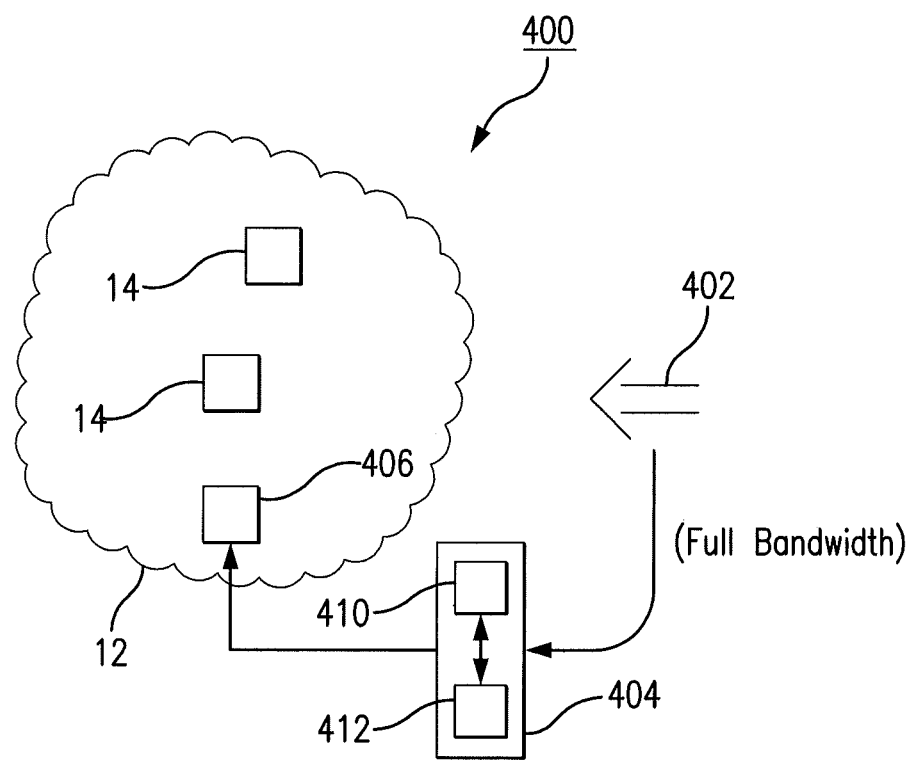
FIG. 5 is a schematic diagram of another system constructed in accordance with this disclosure.

Referring now to FIG. 5, there is shown another system 400 that is constructed in accordance with this disclosure. The illustrated system 400 transmits digital communications signals to the detention environment 12. The system is configured to deliver as much bandwidth 402 as is possible to the detention environment 12, to provide improved voice and speaker recognition to the extent possible. However, some times, there might not be enough bandwidth available to provide the desired voice and speaker recognition in real time at the detention environment 12. At those times, a local server 404 may be employed to cache full wideband audio of some or all conversations that have not been transferred with full audio quality.

After the full wideband audio is cached, and when additional bandwidth is available, typically at night, the local servers 404 can upload (406) the full-quality audio to other servers or the like, where they may be used for speaker recognition analysis, which may supplant an analysis that was previously performed on lower-quality audio recordings that reached the inmate terminals 14.

If storage space in a storage device 410 on the local server 402 is insufficient for storing and/or transmitting all full-bandwidth audio, algorithms (42) provided as a module and running on the local server 404 and/or at a data centers may determine which recordings to delete based on a confluence of attributes, including but not limited to, whether any party on the conversation is flagged manually by an investigator for special action, whether any element of the conversation is flagged by automated speech recognition (as in, for example, recognizing words on a facility- or investigator-provided keyword list), and whether speaker recognition performed on a corresponding lower-quality recording detected any unknown or known and unauthorized voices.

While this disclosure provides specific examples and various embodiments, it should be readily understood by those skilled in the art that many modifications and adaptations of the examples and embodiments described herein are possible without departure from the spirit and scope of the invention as claimed hereinafter. Thus, it is to be understood that this disclosure is made only by way of example and not as a limitation on the scope of the invention claimed below.

What is claimed:

1. A method for routing a call from a public switched telephone network (PSTN) analog telephone terminal to a mobile telephone number away from the PSTN, the method comprising:

receiving the call from the PSTN analog telephone terminal, wherein the call is directed to the mobile telephone number associated with an intended recipient;

identifying a VoIP-enabled device that is associated with the intended recipient and a VoIP address associated with the mobile telephone number;

querying a database to determine whether the intended recipient has an account profile that includes a social network address known to support a VoIP communications system;

determining whether the intended recipient is currently logged in using a compatible application on the VoIP-enabled device, wherein a ring back tone is applied to the PSTN analog telephone terminal when determining; and subsequently, sending a push notification prompting the intended recipient to connect the call from the PSTN analog telephone terminal via the social network address when the intended recipient is not logged in using a compatible application.

2. The method of claim 1, wherein identification information for the VoIP-enabled device is registered in a database before the call is received.

3. The method of claim 2, wherein the identification information comprises the mobile telephone number associated with an intended recipient and the VoIP address associated with the mobile telephone number.

4. The method of claim 1, wherein the identification information for the VoIP-enabled device is obtained from the database after the call is received.

5. A method for routing a call from a public switched telephone network (PSTN) analog telephone terminal to a mobile telephone number away from the PSTN, the method comprising: receiving the call from the PSTN analog telephone terminal, wherein the call is directed to the mobile telephone number associated with an intended recipient; identifying a VoIP-enabled device that is associated with the intended recipient and a VoIP address associated with the mobile telephone number; determining whether the intended recipient is currently online using a compatible application on the VoIP-enabled device, wherein a ring back tone is applied to the PSTN analog telephone terminal when determining; querying a database to determine whether the intended recipient has an account profile that includes a social network address known to support a VoTP communications system; determining whether the intended recipient has a smartphone with the compatible application installed with push notification enabled; and subsequently, sending a push notification to the smartphone to request the intended recipient connect the call over VoIP via the compatible smartphone application when the intended recipient has a smartphone with the compatible application installed with push notification enabled.

6. A method for routing a call from a public switched telephone network (PSTN) analog telephone terminal to a mobile telephone number away from the PSTN, the method comprising: receiving the call from the PSTN analog telephone terminal, wherein the call is directed to the mobile telephone number associated with an intended recipient; identifying a VoIP-enabled device that is associated with the intended recipient and a VoIP address associated with the mobile telephone number; determining whether the intended recipient is currently online using a compatible application on the VoIP-enabled device, wherein a ring back tone is applied to the PSTN analog telephone terminal when determining; querying a database to determine whether the intended recipient has an account profile that includes a social network address known to support a VoTP communications system; determining whether the intended recipient has a smartphone with the compatible application installed with push notification enabled; sending the intended recipient an SMS message with instructions to launch an HTML5 VoIP communications application; and subsequently, connecting the call from the PSTN analog telephone terminal with the intended recipient via the HTML5 VoIP when the intended recipient launches the HTML5 VoIP communications application.

* * * * *